United States Patent
Perry

(10) Patent No.: US 12,476,269 B2
(45) Date of Patent: Nov. 18, 2025

(54) RECHARGEABLE LIQUID FUEL CELL SYSTEM AND METHOD

(71) Applicant: FLOW CELL TECH, LLC, Noank, CT (US)

(72) Inventor: Michael L. Perry, Noank, CT (US)

(73) Assignee: FLOW CELL TECH, LLC, Noank, CT (US)

( * ) Notice: Subject to any disclaimer, the term of this patent is extended or adjusted under 35 U.S.C. 154(b) by 0 days.

(21) Appl. No.: 17/573,612

(22) Filed: Jan. 11, 2022

(65) Prior Publication Data

US 2022/0223895 A1 Jul. 14, 2022

Related U.S. Application Data

(60) Provisional application No. 63/135,921, filed on Jan. 11, 2021.

(51) Int. Cl.
*H01M 8/22* (2006.01)
*H01M 8/18* (2006.01)

(52) U.S. Cl.
CPC ............ *H01M 8/225* (2013.01); *H01M 8/184* (2013.01); *H01M 2300/0005* (2013.01)

(58) Field of Classification Search
CPC .................................................. H01M 8/225
See application file for complete search history.

(56) References Cited

U.S. PATENT DOCUMENTS

| 10,944,119 B2* | 3/2021 | Sasson | .................. C01B 3/0073 |
| 2016/0272490 A1* | 9/2016 | Sasson | ..................... B01J 21/18 |
| 2021/0194031 A1* | 6/2021 | Yang | ................... H01M 4/5825 |

* cited by examiner

*Primary Examiner* — Karie O'neill Apicella
(74) *Attorney, Agent, or Firm* — Barry F. Manna

(57) ABSTRACT

A rechargeable liquid fuel cell system includes an aqueous liquid fuel having a formate salt and a bicarbonate salt. The formate salt electrochemically converts to the bicarbonate salt upon discharge, and the bicarbonate salt electrochemically converts to the formate salt upon charge.

10 Claims, 26 Drawing Sheets

Calculate $E°$ for key Reactions: $\Delta G° = -nFE°$

For the Discharging reaction (and Charging reaction with O2, in the opposite direction):

1) HCOO⁻ + ½O₂ → HCO₃⁻   $\Delta G° = -0.56.36$ kcal/mol = $-235,810$ J/mol
   -83.9      0         -140.26              $\Delta E° = -(-235,810$ J/mol$)/(2*96,487$ J/V-mol$) = +1.22$ V For the Charging reaction with H2, the voltage is ≈ 0 (this shows bicarbonates are ideal for H2 storage):

2) HCO₃⁻ + H₂ → HCOO⁻ + H₂O   $\Delta G° = -0.327$ kcal/mol = $-1,368$ J/mol
   -140.26    0    -83.9   -56.687    $\Delta E° = -(-1,368$ J/mol$)/(2*96,487$ J/V-mol$) = +0.007$ V ≈ 0

Compare rxn #1 to the reaction that occurs under highly acidic conditions:

3) HCOO⁻ + ½O₂ → CO₂ + H₂O   $\Delta G° = -67.041$ kcal/mol = $-280,500$ J/mol
   -83.9      0    -94.254  -56.687    $\Delta E° = -(-280,500$ J/mol$)/(2*96,487$ J/V-mol$) = +1.45$ V Compare rxn #1 to the reaction that occurs under highly basic conditions:

4) HCOO⁻ + ½O₂ + OH⁻ → CO₃²⁻ + H₂O   $\Delta G° = -61.36$ kcal/mol = $-256,748$ J/mol
   -83.9      0   -37.57  -126.15  -56.687    $\Delta E° = -(-256,748$ J/mol$)/(2*96,487$ J/V-mol$) = +1.33$ V

*FIG. 3*

INVENTION: Choice of separator material

- Ideally want a separator that is electrically non-conductive, and enables the transport of desired charge carriers, but prevents transport of other species (i.e., is selective)
- There is typically a trade-off with separators of conductivity vs. selectivity
  * Some crossover is likely to occur with high-conductivity membranes, since properties that promote higher transport rates of desired charge carriers also tends to increase transport of other species
  * Therefore, a separator with perfect selectivity for the desired charge carriers will typically result in larger ohmic losses across the separator, which is undesirable
- Preferably, use some sort of an ion-exchange membrane (IEM)
  * The liquid solution is not that ionically conductive (i.e., it is a weak electrolyte)
  * Sufficient for ion transport over very short distances (e.g., in electrodes), but not in thicker layers like the separator
  * The IEM may be a composite, such as reinforced with other materials (e.g., microporous PTFE) to enhance mechanical properties of thin layers Multiple IEM options:

- Cation-exchange membrane (CEM)
  * Protons, or hydronium cations ($H_3O^+$), are the desired charge carriers (which have high mobility)
  * May help to mitigate crossover of formate and bicarbonate anions due to fixed anions in CEM
  * Positive electrode is likely to be acidic ($pH < 7$), and this will prevent carbonate salts from forming
    * Major issue with AEMFCs, due to presence of $CO_2$ in the air ($\approx 400$ ppm)
    * In this case, bicarbonates that crossover may also result in formation of carbonate salts that may precipitate out and block electrodes

- Anion-exchange membrane (AEM)
  * Hydroxyl anions ($OH^-$) are the desired charge carrier (which have lower mobility than protons, but still good)
  * Key advantage is that this may enable less expensive catalyst for ORR (i.e., non-PGM)
  * May also improve the kinetics of the formate/bicarbonate reaction
  * May mitigate formation of carbonates if pH is not too high (e.g., use ionomer in electrode that is weak base)

FIG. 6

Separator Design options

- Separator may consist of one, or more, layers

Example of multiple-layer options:

1. At least one layer has very small pores (to prevent transport of larger species)
   - This layer is very thin, to minimize ohmic losses
   - At least one additional layer to provide mechanical support of this very thin layer
     - These layers are preferably IEM materials, but may be non-IEMs
   - In example shown here (top figure), the very thin and selective layer is graphene, which is shown to be selective for transport of protons but not V or Mg ions (which are smaller than formate or bicarbonate ions)
   - Layer with very small pores may alternatively be a polymer (e.g., PBI) instead of graphene 2. A "bipolar membrane" where one layer is a CEM and the other is an AEM
   - In aqueous solutions, protons and hydroxyls are the majority ions and they travel in opposite directions with an electric field, so the net result in this separator is:

$2H^+ + OH^- \rightarrow H_2O$
   - The two layers should be thin, to minimize ohmic losses
   - In example shown here (bottom figure), this configuration is used in a cell that is used to convert bicarbonate ions to formate ions one the one electrode (i.e., charge reaction proposed herein), while the opposite electrode does OER

*FIG. 7*

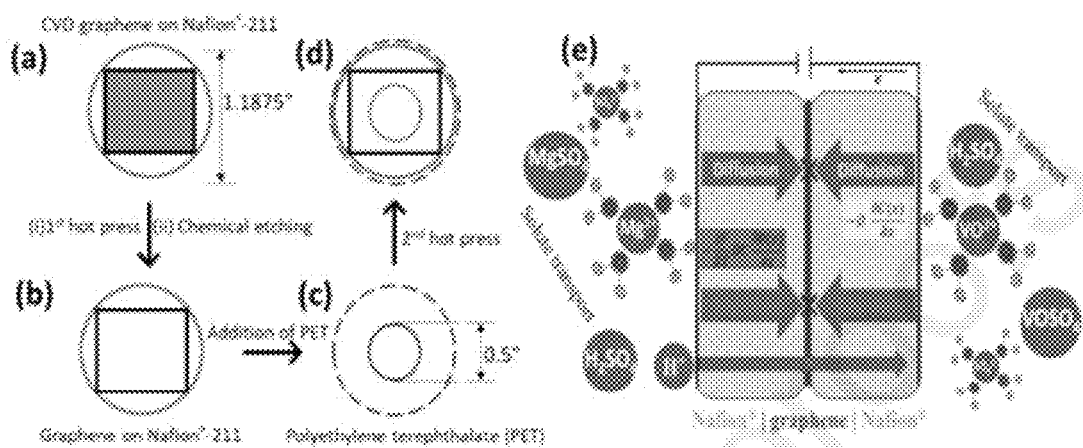
B. Pivovar, et.al., "Single-layer graphene as a highly selective barrier for vanadium crossover with high proton selectivity, J. of Energy Chem, (2020)
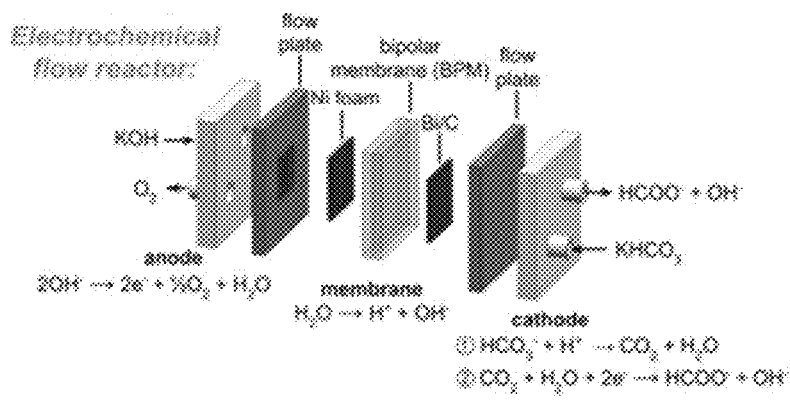
C. P. Berlinguette, et.al., ACS Energy Lett., 5 (2020) 2624
*FIG. 8*

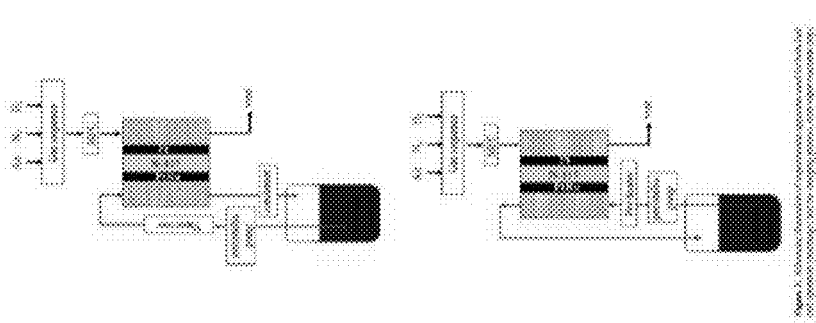

INVENTION (cell design): Bipolar Plate Material Options

May use conventional (i.e., solid plate) comprised of conventional materials (i.e., carbon or metals)

- Solid Bipolar Plates (one possible option here)
  * These are conventionally used in most fuel cells, since they provide a solid barrier between the reactants on the two electrodes and low ohmic losses (comprised of material with high electrical conductivity)
  * However, typically requires water management components (e.g., humidifiers) in conventional H2/air cell
- Many material options, especially in a near-neutral pH environment (e.g., graphite, metals, composites)
- Key benefit of using H2 for charging (as shown in figure):
  * Enables more material options for plates, since the positive electrode does not need to be subjected to high potentials, like it does if one is splitting water during charging
  * For example, entire bipolar plate may be comprised of graphite or a moldable graphite composite Figure copied from: M. Perry & Z. Yang, J. Electrochemical Society, 166 (2019) F3268.

FIG. 9

INVENTION: Bipolar Plate Design Options
*May use conventional (i.e., solid plates) or variations of microporous plates, or combinations of both*

- Water-Transport Plates (WTPs)
  - Comprised of porous solid with small, uniform and hydrophilic pores, and provides a gas barrier by keeping these pores filled with liquid (e.g., water in conventional H2/air cells)
  - Enables internal passive water management, well hydrated membranes, and system simplification
  - Fewer material options, to date (e.g., graphite or composites)
- "Hybrid" Bipolar Plates (another option)
  - Comprised of both a micro-porous layer and a solid layer; one electrode or both could use this
  - *Membrane dry out is not be a concern here, but flooding of gas electrode is a potential concern*
    - May use porous plate layer for gas channels (as depicted in top figure)
    - On gas electrode, water may be circulated at lower pressure than gas to provide water removal; it may also provide:
      - thermal management (e.g., circulate this water through an external heat exchanger or utilize evaporative cooling as described in M. L. Perry, et.al., "Evaporatively Cooled PEM Fuel Cell Stack and System," *ECS Transactions*, 3 (2006) 1207
      - Removal of foreign anions or cations on gas electrode by circulating the water through a demineralizer bed (i.e., an ion-exchange resin)
    - If reactant is water (e.g., on anode during charge), then water in plate may be circulated at elevated P and gas removal may be via the open channels
  - On the liquid electrode, one may use a microporous plate layer with hydrophobic pores and circulate liquid in the channels while using the pores to help gases (e.g., $H_2$) exit the cell

*FIG. 10*

INVENTION: Flow-Field Design Options

*Preferred configuration of liquid electrode is "through-flow" design to minimize mass transport losses*

- Positive electrode may be similar to those used in other fuel cells
  - May use straight gas channels, serpentine channels, or interdigitated flow-field (IDFF) design as depicted in top figure
  - Primary goal is to deliver gases uniformly to entire electrode area in all of the cells without excessive pressure drop
    * However, higher pressure drop designs, such as the serpentine design may be preferable for water removal in the channels (*i.e.*, solid plates)
  - The IDFF design is ideal for porous-plate design where water removal is into the plate (not down the channel) and the gas is single phase (i.e., fully humidified gas)

- Negative electrode can be similar to those used in redox flow batteries (RFBs)
  - Active species dissolved in liquids have much lower transport rates than gaseous reactants (*i.e.*, much smaller diffusion coefficients than gases)
  - Preferable design is "mixed flow," where liquid transport across the cell is a mixture of flow through channels (to minimize pressure drop) and also flow through the adjacent electrode layers (to minimize mass-transport losses)
  - One ideal configuration is IDFF, which works exceptionally well with single-phase flow (gas should be limited to that generated, e.g., H2, and may be removed by ensuring that flow is from bottom to top of cell
    * IDFF has enabled RFBs with high performance (bottom figure)

*FIG. 12*

Impact of crossover (w/ acidic gas electrode)

- The impact of crossover of species in the liquid will depend on the fate of the species on the gas electrode
- If, *the pH of the gas electrode is low (i.e., acidic)*, which can be enabled by using a highly acidic ionomer (e.g., a strong acid, like PFSA)
  - The liquid phase on this electrode is primarily pure water, which will help keep these species in solution (i.e., they stay dissolved, unless they react)
- If bicarbonate (or carbonate) anions xover:
  - Most, or all, of these bicarbonates/carbonates will be converted to $CO_2$, due to the low pH environment
  - The $CO_2$ will leave the cell as a gas (*i.e., no negative impact, other than the slow loss of reactant*)
- If formate anion xover occurs, with oxygen on gas electrode, then formate oxidizes, due to the high oxidizing potential, especially in the presence of most catalysts used to promote the ORR in an acidic environment (e.g., PGMs):

$$HCOOH_{(aq)} \rightarrow CO_{2(aq)} + 2H^+_{(aq)} + 2e^-$$

- The $CO_2$ will leave the cell as a gas (*i.e., no negative impact, other than the slow loss of reactant*)
- If formate xover, with hydrogen on gas electrode, then formate may still be oxidized (see figure, e.g., graph "b") or it may accumulate until next time electrode is exposed to oxidizing conditions (e.g., air)
  - Crossover is less likely during charging with an acidic electrode since species are "going upstream" vs. proton flux
- If salt cations xover, they will occupy anionic sites in the ionomer or IEM, since the free anions will be converted to $CO_2$ as explained above
  - These foreign cations may be periodically removed, if needed, as described subsequently

*FIG. 14*

Impact of crossover (w/ acidic gas electrode)

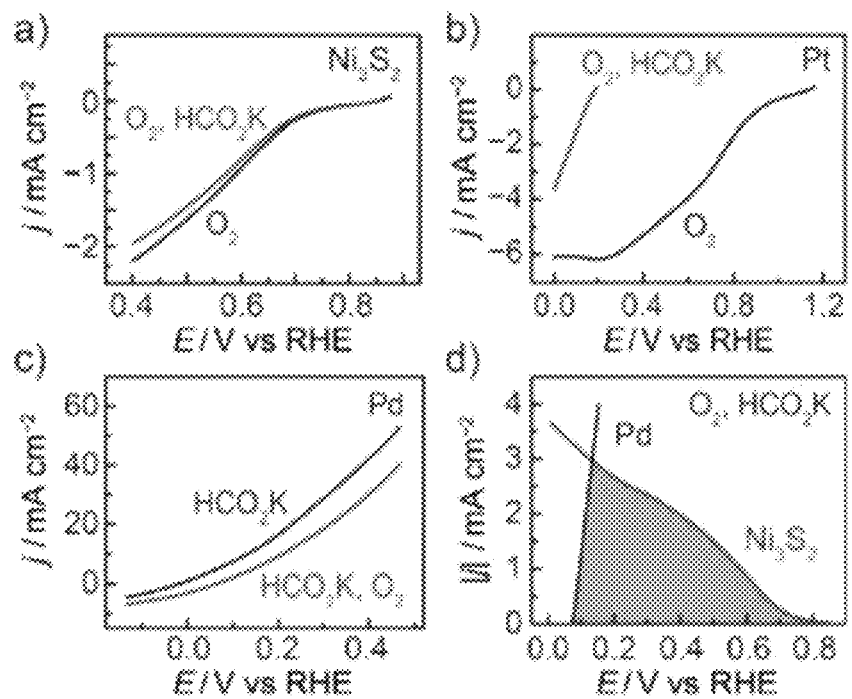

*Figure 2.* The LSV of a) Ni$_3$S$_2$/C and b) Pt/C recorded in O$_2$-saturated 0.1 M KP$_i$, pH 7, electrolyte with (red) and without (black) 1.0 M HCO$_2$K. c) LSV of Pd/C in N$_2$- (black) and O$_2$-saturated (red) 0.1 M KP$_i$, pH 7, electrolyte containing 1.0 M HCO$_2$K. d) Overlay of LSV curves recorded in O$_2$-saturated (red) 0.1 M KP$_i$, pH 7, electrolyte containing 1.0 M HCO$_2$K, with the absolute values of the current density for Ni$_3$S$_2$/C (red) and Pd/C (black). All data were collected at 5 mVs$^{-1}$ scan rate and 2000 rpm rotation rate.

This figure shows that the reaction of formate in mixed environment (*e.g.*, O$_2$ + HCO$_2$K) will depends on catalyst and the pH (the bulk solution is neutral, but electrodes use PFSA as binder (low *pH*)

Figure copied from: F. Brushett, Y. Surendranath et.al., *Angew. Chem. Int. Ed.*, 320 (2017) 7496.

FIG. 15

Impact of crossover (w/ alkaline gas electrode)

- The impact of crossover of species in the liquid will depend on the fate of the species on the gas electrode
- IF, the $pH$ of the gas electrode is high (i.e., basic), this may result in formation of insoluble carbonates from xover (and from $CO_2$ in air) and should be avoided
- If formate xover occurs:
  - with oxygen on gas electrode, then formate oxidizes to bicarbonates, due to the high oxidizing potential, especially in the presence of most catalysts used to promote the ORR in an acidic environment (e.g., PGMs):

$HCOO^- + 2OH^- \rightarrow HCO_3^- + H_2O + 2e^-$

- with hydrogen on gas electrode, then formate may still be oxidized, or it may accumulate until next time electrode is exposed to oxidizing conditions (e.g., air)
  - In either case, this will result in bicarbonate anions on the gas electrode, which is the same as bicarbonate xover (described below)
- If bicarbonate (or carbonate) anions xover (or are generated due to formate xover):
  - Most, or all, of these bicarbonates/carbonates will remain, or be converted to, bicarbonates due to the moderate $pH$ environment
  - Bicarbonates have relatively high solubility and may stay in solution (if there are any free cations are present) or will occupy cationic sites in the ionomer or IEM
  - Carbonates will form, especially if the $pH$ of the gas electrode is relatively high (i.e., uses strong base ionomer)
    - Similar to the problem in a conventional AEMFC, where carbonates form due to $CO_2$ in air stream and high $pH$
    - These foreign anions can be periodically removed, if needed, as described subsequently

*FIG. 16*

New System Component: Use of a "Symmetric Cell"

*A new component that may optionally be included in system to enable some operating Methods*

- Simple schematic of "symmetric" cell
  - Described here as one cell, but could be multiple cells
- This type of cell is commonly used as RFB testing protocol
  - This has not been used as a system component
- In this case, both sides have the liquid electrolyte
  - One side is being charged:
    $HCO_3^- + 2H^+ + 2e^- \rightarrow HCOO^- + H_2O$  OR
    $HCO_3^- + H_2O + 2e^- \rightarrow HCOO^- + 2OH^-$
  - Other side is being discharged:
    $HCOO^- + H_2O \rightarrow HCO_3^- + 2H^+ + 2e^-$  OR
    $HCOO^- + 2OH^- \rightarrow HCO_3^- + H_2O + 2e^-$

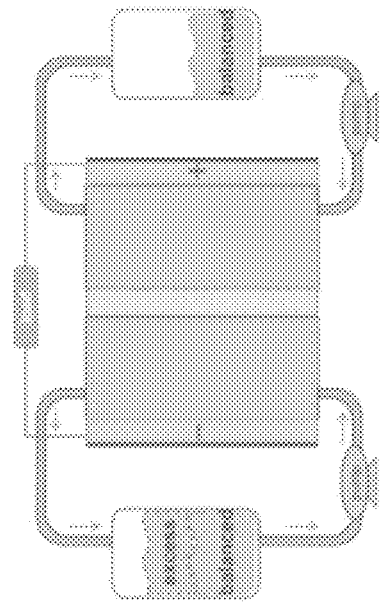

b     Liquid-based symmetric cell

- The cell OCV is ~ 0 if composition of the electrolytes on both sides are similar
  - A voltage is applied to generate current in this cell
  - Typically done during charging process (when energy is less valuable)
    - Electrolyte(s) created can be stored and used at another time
  - Net change in electrolyte is zero (would return to same state if two sides were mixed)
- Net reaction of the two half reactions is zero, however:
  - One side is enriched in formates (charged) and the other is enriched in bicarbonates (discharged)

- Symmetric cell can have a separate reservoir (or vessel) for only one side or for both sides
- A small reservoir may be filled with highly charged electrolyte (i.e., depleted in bicarbonates)
  - *This can be used to dissolve bicarbonates (shown on next slide)*
- Alternatively, a small reservoir may contain very low-SoC electrolyte (i.e., ≈ 0 SoC, depleted in formates)
  - *This can be used to dissolve carbonates (described previously)*

*FIG. 22*

INVENTION: Operating at high "fuel" concentrations (i.e., high concentration of formate salts)

Simple means of maximizing the energy density of the charge solution

- This concept utilizes 2-phase storage, as taught previously
- However, also explicitly shows how high concentrations of fully-charge solution, or formate solids, may optionally be introduced
  * These may be solid formate salts or very high concentrations of formate salts (e.g., ≥ 10 M)
  * If solid, then means to transfer the solid into 2-phase vessel is required (not shown)
- The system has sufficient liquid to fill all of the cells, recirculation loops, and recirculation pump (not shown)
- Method of operation:
  * Concentrated reactant is metered into system during discharge
  * The 2-phase vessel has sufficient volume to accommodate all of the original liquid, plus the volume added from reactant vessel
  * At the end of discharge, the 2-phase vessel may be removed from the system and processed externally (i.e., charged into formate-salt rich solution and concentrated to maximize energy density)

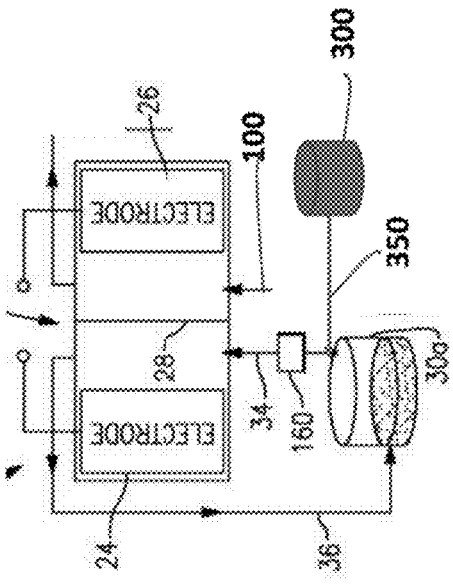

Components in this modified Figure are the same as previous, with these added components:

300 = vessel for concentrated, or solid, reactant
350 = feed line for concentrated, or solid, reactant

*FIG. 26*

INVENTION: Operating at high "fuel" concentrations & reduced weight with discharge

An optional method of operation to maximize energy density (i.e., for onboard vehicles)

- This concept utilizes the concept taught on previous slide with the addition of minimizing the amount of discharge product stored onboard
- The storage tank is purposely heated to accelerate decomposition rxn:

$$2HCO_3^- \longrightarrow CO_3^{2-} + CO_2 + H_2O$$

- The $CO_2$ generated is vented from the tank via gas vent (400 in figure)
  - The formation of carbonates will also promote precipitation inside the tank
  - The heat required may come from the cell (i.e., heat generated by cell is transported to tank via electrolyte and/or coolant)
- Up to ~ ½ of the discharge product is vented during discharge, which must be replenished (i.e., like a fuel)
- Method of operation:
  - Concentrated reactant is metered into system during discharge
  - The 2-phase vessel has sufficient volume to accommodate all of the original liquid, plus just some of the volume from reactant vessel
  - At the end of discharge, the 2-phase vessel may be removed from the system and replenished externally; namely:
    1. The carbonates are converted to bicarbonates by doing reverse of reaction above (i.e., add $CO_2$ and $H_2O$)
    2. Charged into formate-salt rich solution and concentrated to maximize energy density)
  - Alternatively, the carbonates can be disposed of and formates can be generated directly (e.g., ideally, produced from $CO_2$)
    * In this case, the system is like a conventional fuel cell Components in this modified Figure are the same as previous, with these added components:

- 300 = vessel for concentrated, or solid, reactant
- 350 = feed line for concentrated, or solid, reactant
- 400 = gas vent from tank (may include a pressure-release valve, not shown)

*FIG. 27*

RECHARGEABLE LIQUID FUEL CELL SYSTEM AND METHOD

RELATED APPLICATIONS

Reference is made to and this application claims priority from and the benefit of U.S. Provisional Application Ser. No. 63/135,921, filed Jan. 11, 2021, entitled "RECHARGEABLE LIQUID FUEL CELL SYSTEM AND METHOD", which application is incorporated herein in its entirety by reference.

BACKGROUND OF THE INVENTION

This disclosure relates generally to fuel cells and, more specifically, to a reversible fuel cell that utilizes a novel liquid fuel chemistry.

A rechargeable liquid fuel-cell (RLFC) system can provide an attractive means for transporting and storing energy for a variety of applications, such as electric vehicles (EVs) or grid-scale electrical-energy storage (EES). However, the liquids proposed for RLFCs to date have suffered from relatively poor performance, especially with liquids that have reasonably high energy densities (i.e., on par with conventional Lithium-ion batteries). These performance issues are due to, for example, slow reaction kinetics of the liquid species, challenges associated with the reversibility of the air electrode, and crossover of one or more of the species in the liquid to the air electrode that negatively impacts the air electrode.

BRIEF SUMMARY OF THE INVENTION

In accordance with one aspect of the disclosure, a reversible aqueous liquid fuel for a rechargeable fuel cell system includes a formate salt and a bicarbonate salt. The formate salt electrochemically converts to the bicarbonate salt upon discharge, and the bicarbonate salt electrochemically converts to the formate salt upon charge.

BRIEF DESCRIPTION OF THE DRAWINGS

The features described herein can be better understood with reference to the drawings described below. The drawings are not necessarily to scale, emphasis instead generally being placed upon illustrating the principles of the invention. In the drawings, like numerals are used to indicate like parts throughout the various views.

FIG. 3 depicts a table showing the electrochemical potential E° for key reactions;

FIG. 6 depicts a description of material choices for the separator shown in FIG. 5;

FIG. 7 depicts a description of design options for the separator shown in FIG. 5;

FIG. 8 depicts drawings of design options for the separator shown in FIG. 5;

FIG. 9 depicts a description and drawings of material options for the bipolar plate shown in FIG. 5;

FIG. 10 depicts a description of design options for the bipolar plate shown in FIG. 5;

FIG. 12 depicts a description of design options for the flow fields in the negative and positive electrodes shown in FIG. 5;

FIG. 14 depicts a description of the impact of species crossover in the separator shown in FIG. 5 with an acidic gas electrode;

FIG. 15 depicts drawings of the impact of species crossover in the separator shown in FIG. 5 with an acidic gas electrode;

FIG. 16 depicts a description of the impact of species crossover in the separator shown in FIG. 5 with an alkaline gas electrode;

FIGS. 22 and 23 depict a description, drawings, and method of operation for a symmetrical cell according to another embodiment of the present invention;

FIGS. 26 and 27 depict a description, drawings, and method of operation for maximizing the energy density of the charge solution shown in FIG. 5.

DETAILED DESCRIPTION OF THE INVENTION

A rechargeable aqueous liquid with formate salts produces the corresponding bicarbonate salts on discharge. These bicarbonate salts may be subsequently charged to the original formate salts. This rechargeable-liquid chemistry is accomplished with a unique fuel cell system and operating strategies that enables the necessary conditions are maintained to ensure the desired reactions. It also includes a number of recovery strategies to mitigate the impact of decay mechanisms in order to maximize the lifetime of the liquid and the fuel-cell system.

Figure 1:
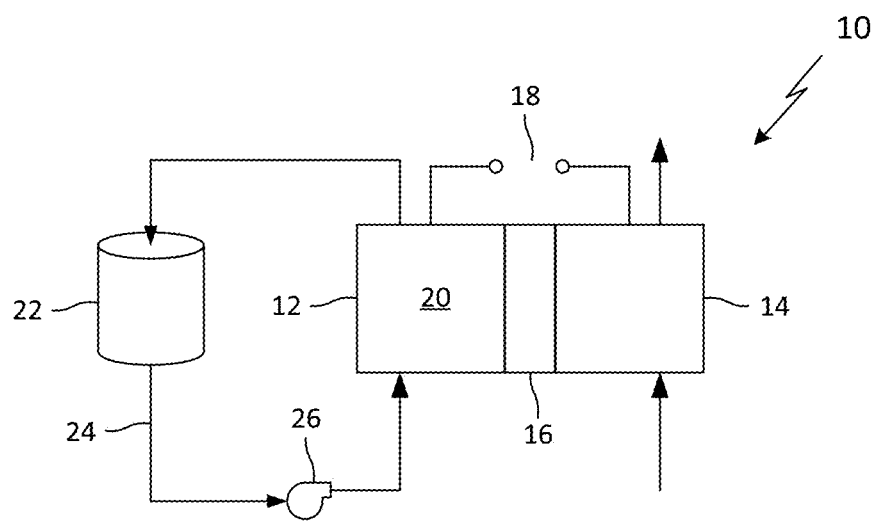
FIG. 1 schematically illustrates a rechargeable fuel cell system according to one embodiment of the present invention.

FIG. 1 depicts a rechargeable liquid fuel cell system 10 according to one embodiment of the present invention. The system 10 includes a first electrode 12, a second electrode 14, and an electrolyte separator 16 arranged between the electrodes 12, 14. The electrodes 12, 14 are connected to an electric circuit 18.

The first electrode 12 includes an electrochemically-reversible aqueous liquid fuel 20 comprising a formate salt and a bicarbonate salt. The system 10 further includes at least one vessel 22 fluidly connected in a recirculation loop 24 with the first electrode 12. The vessel 22 can hold the liquid fuel solution 20 for recirculation through the first electrode 12 during operation of the fuel cell system 10. The recirculation loop 24 may also include one or more pumps 26 to facilitate the recirculation of the liquid solution 20 through the loop 24, vessel 22, and first electrode 12.

The second electrode 14 may be a gas electrode, such as an oxygen-containing gas, including air. In one embodiment, the second electrode 14 is a reversible air electrode.

Further description of the first and second electrodes 14, 16 and the electrolyte separator 16 will be provided below.

Figure 2:
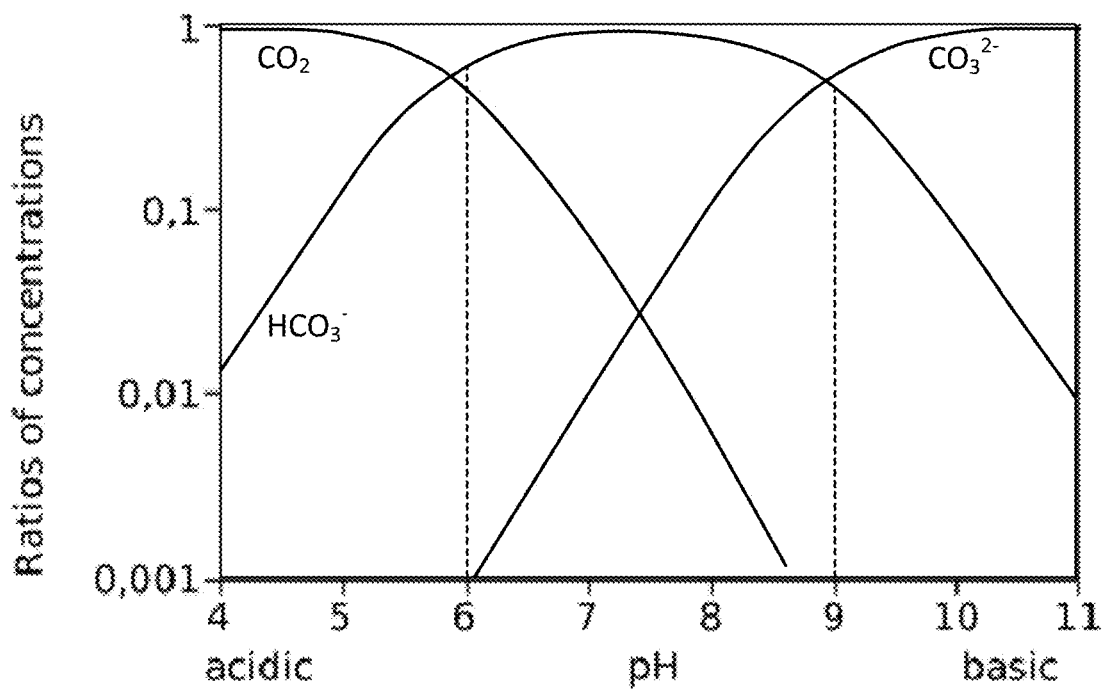
FIG. 2 depicts a plot showing the calculated equilibrium concentrations of the three carbonate species in seawater.

As noted, the liquid fuel 20 includes an aqueous solution including formate salts and bicarbonate salts. Aqueous solutions with carbonate species consist of three species in equilibrium: dissolved $CO_{2(aq)}$, bicarbonate ions $HCO_3^-$, and carbonate ions $CO_3^{2-}$. The ratios of the three species strongly depend on pH. For example, FIG. 2 depicts a plot showing the calculated equilibrium concentrations of the three carbonate species in seawater. According to the invention, it is desirable for the aqueous solution to have a high concentration of bicarbonate ions, a low concentration of carbonate ions, and minimize, to the extent possible, the concentration of dissolved carbon dioxide. Thus, in one embodiment, the pH range of the aqueous liquid fuel 20 is preferably between about 5 and 10, and most preferably between about 7 and 8. Under these conditions, the bicarbonates concentrations are at least 10 to 20 times higher than the carbonates or $CO_2$.

Maintaining the pH of the bulk liquid 20 in a range between 5 and 10 may be important to achieving the desired electrochemical reactions. For example, if the fuel 20 becomes too acidic, the bicarbonates will become carbonic acid, which will then decompose to $CO_2$ and $H_2O$ according to the following exemplary reactions (which should be avoided):

$$NaHCO_3 + HCl \rightarrow H_2CO_3 + NaCl \tag{1}$$

$$H_2CO_3 \rightarrow CO_2 + H_2O \tag{2}$$

During discharge of the fuel cell 10, i.e., when generating electricity, the formate salts in the liquid electrolyte 20 are electrochemically converted to bicarbonate salts and electrical energy is generated. The desired reactions are dependent upon proper pH range, and straddle the neutral pH of 7; being slightly acidic or basic. Accordingly, the reactions at the positive and negative electrodes will be different depending on the pH being above or below 7.

On the negative electrode, i.e., anode, the desired reaction for the direct oxidation of formate ions to bicarbonate ions in a slightly basic liquid electrolyte solution 20 (pH≈7 to 10) is $$HCOO^-_{(aq)} + 2OH^-_{(aq)} \rightarrow HCO_3^-_{(aq)} + H_2O + 2e^-, \tag{3.1}$$

while in a slightly acidic liquid electrolyte solution 20 (pH≈5 to 7) the desired reaction for the direct oxidation is $$HCOO^-_{(aq)} + H_2O \rightarrow HCO_3^-_{(aq)} + 2H^+ + 2e^-. \tag{3.2}$$

On the positive electrode, i.e., cathode, the desired reaction for the oxygen-reduction reaction ORR for the slightly basic case is $$\tfrac{1}{2}O_{2(gas)} + H_2O + 2e^- \rightarrow 2OH^-_{(aq)}, \tag{4.1}$$

and the desired reaction for the ORR for the slightly acidic case the is $$\tfrac{1}{2}O_{2(gas)} + 2H^+(aq) + 2e^- \rightarrow H_2O. \tag{4.2}$$

In the acidic case the oxygen is being reduced to water, and in the basic case oxygen is being reduced to hydroxyls (OH groups). The overall cell reaction for each case, slightly acidic or basic, is the same:

$$\tfrac{1}{2}O_2 + 2H^+ + 2e^- \rightarrow H_2O$$

$$HCOO^- + H_2O \rightarrow HCO_3^- + 2H^+ + 2e^-$$

$$\tfrac{1}{2}O_2 + HCOO^- \rightarrow HCO_3^- \tag{5}$$

$$\tfrac{1}{2}O_2 + H_2O + 2e^- \rightarrow 2OH^-$$

$$HCOO^- + 2OH^- \rightarrow HCO_3^- + H_2 + 2e^-$$

$$\tfrac{1}{2}O_2 + HCOO^- \rightarrow HCO_3^- \tag{6}$$

During charging of the fuel cell 10, the bicarbonate salts in the liquid electrolyte 20 are electrochemically converted back to formate salts with electrical energy input. The desired reactions are also dependent upon proper pH range, and straddle the neutral pH of 7; being slightly acidic or basic. Accordingly, the reactions at the positive and negative electrodes will be different depending on the pH being above or below 7.

On the negative electrode, i.e., cathode, the desired reaction for the direct reduction of bicarbonate ions to formate ions in a slightly basic liquid electrolyte solution 20 (pH≈7 to 10) is $$HCO_3^-_{(aq)} + H_2O + 2e^- \rightarrow HCOO^-_{(aq)} + 2OH^-_{(aq)}, \tag{7.1}$$

while in a slightly acidic liquid electrolyte solution 20 (pH≈5 to 7) the desired reaction for the direct reduction is $$HCO_3^-_{(aq)} + 2H^+_{(aq)} + 2e^- \rightarrow HCOO^-_{(aq)} + H_2O. \tag{7.2}$$

Of note, a significant side reaction that is not desirable, but may occur, is the protons combining with themselves to form hydrogen gas:

$$2H^+_{(aq)} + 2e^- \rightarrow H_{2(gas)} \tag{7.3}$$

On the positive electrode. i.e., anode, protons are generated via reactions that depend upon the reactant and the local pH. In one embodiment, the air electrode 14 is reversible and a desired reaction is an oxygen evolution reaction (OER). For the slightly basic case, the OER reaction is $$2OH^-_{(aq)} \rightarrow \tfrac{1}{2}O_2 + H_2O + 2e^-, \tag{8.1}$$

and the desired reaction for the OER for the slightly acidic case is to split water into oxygen and protons:

$$H_2O \rightarrow \tfrac{1}{2}O_2 + 2H^+_{(aq)} + 2e^-. \tag{8.2}$$

In another embodiment, hydrogen may be supplied to the air electrode 14 to rehydrogenate the liquid 20 with protons by oxidizing hydrogen instead of splitting water. For the slightly basic case, the hydrogen oxidation reaction (HOR) is:

$$H_2 + 2OH^-_{(aq)} \rightarrow 2H_2O + 2e^-, \tag{8.3}$$

and for the slightly acidic case the HOR is:

$$H_2 \rightarrow 2H^+_{(aq)} + 2e^-. \tag{8.4}$$

The overall cell reaction for each OER case, slightly acidic or basic, is the reverse of the reactions shown in Eqs. (5) and (6). The overall cell reaction for each HOR case, slightly acidic or basic, is:

$$H_2 \rightarrow 2H^+ + 2^-$$

$$HCO_3^- + 2H^+ + 2e^- \rightarrow HCOO^- + H_2O$$

$$HCO_3^- + H_2 \rightarrow HCOO^- + H_2O \quad (9)$$

$$H_2 + 2OH^- \rightarrow 2H_2O + 2e^-$$

$$HCO_3^- + H_2O + 2e^- \rightarrow HCOO^- + 2OH^-$$

$$HCO_3^- + H_2 \rightarrow HCOO^- + H_2O \quad (10)$$

In either case, if some $H_2O$ is lost during discharge (e.g., exits in the air exhaust), it can potentially be made up during the recharging process. The generated water may be utilized in fuel cell water balance or it may be exhausted, for example. The exhausted water may be utilized to remove heat for fuel cell thermal balance.

FIG. 3 depicts a table showing the electrochemical potential $E^o$ for key reactions, derived from the Gibbs formation energy of the individual elements and calculated stoichiometry. The overall cell discharging reaction potential of 1.22 V is similar to a PEM fuel cell, and the overall cell charging reaction with hydrogen yields almost no charge potential (0.007 V). In other words, the energetics of putting hydrogen into the molecules is almost zero, demonstrating bicarbonates are an ideal hydrogen storage medium.

Regarding the composition of the rechargeable liquid 20, a range of both salt compositions (e.g., choice of cations) and concentrations is possible. The energy density of the liquid 20 depends on the concentration, e.g., how many moles of the formate can be dissolved in water will dictate how much energy is in the liquid. For single-phase operation (i.e., all solids remain dissolved in the aqueous liquid), the desired concentration is about 1M to 5M.

Higher formate concentrations (about 5M to 20M) may be enabled by utilizing a 2-phase (solid/liquid) solution stored inside the vessel 22, in which case the system is not limited by solubility. In this example, the liquid 20 is supersaturated in both formate and bicarbonate species. As the liquid 20 charges and discharges, one of the species is being depleted and the second species is added to. The species being added to will tend to precipitate because it has reached its saturation limit, and the other species that is being depleted, if it is in contact with that solid, will tend to dissolve some of that solid. Thus, the liquid can be replenished by having it in quasi-equilibrium with the solid salts in the vessel 22, which generally are not circulated.

Figure 4:
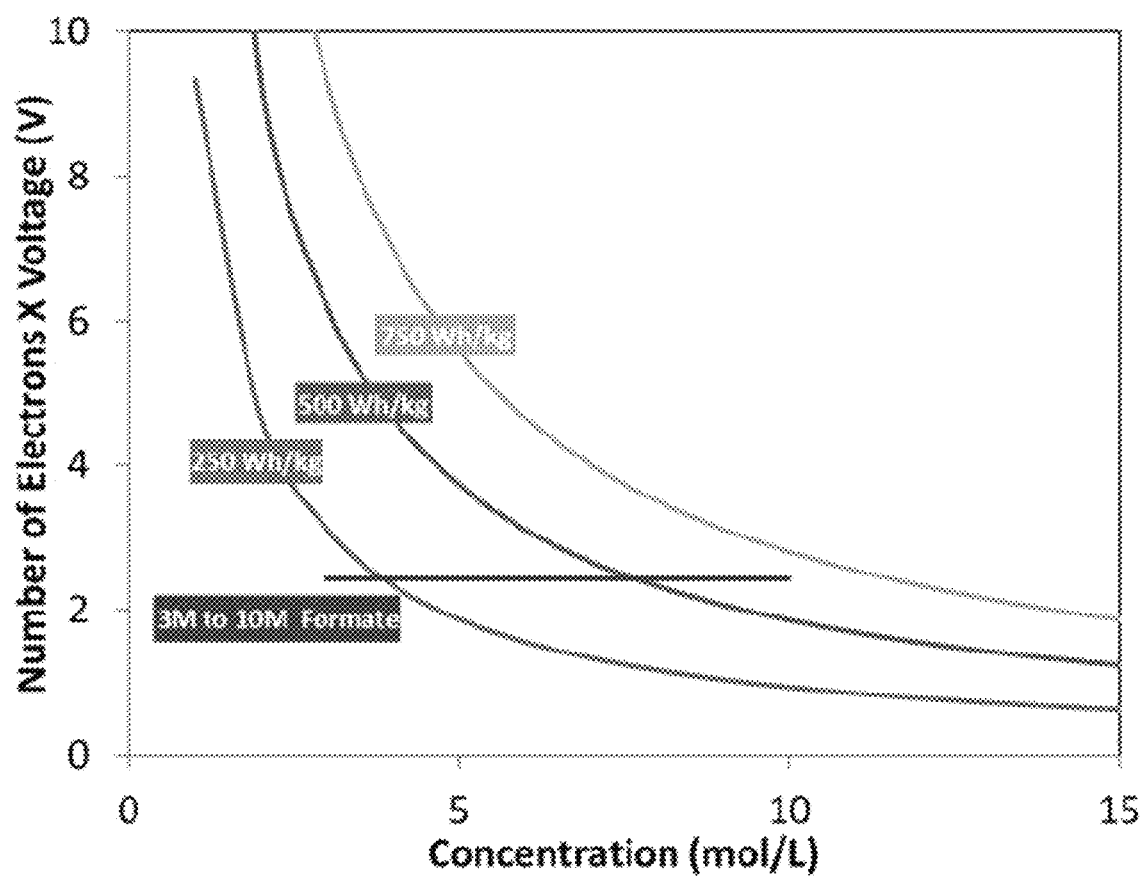
FIG. 4 depicts a plot showing expected energy densities of a rechargeable liquid at expected concentrations.

FIG. 4 illustrates expected energy densities of the rechargeable liquid 20 at expected concentrations. The y-value of 2.44 V (1.22 V×2 electrons per molecule) is plotted against x-value concentrations of 3 to 10 moles/liter, disclosing that energy densities of 250 Wh/kg to near 700 Wh/kg are possible. By way of comparison, the energy density of lithium-ion batteries is about 200 Wh/kg. Therefore, the disclosed fuel cell system may have application in vehicles, where the liquid fuel 20 can be recharged in minutes, while decoupled from the power grid.

The choice of the cation for the formate/bicarbonate salt can impact solubility, and depends on many factors, including: the solubility and pH of both salts, the impact on reaction kinetics, and the viscosity and ionic conductivity of the solution. In one example, the cations may be relatively large to mitigate membrane crossover. This may also enhance the solubility of the bicarbonates, as well as reaction kinetics. The cations may be selected from a group comprising metals and the like, alkaline metals, or transition metals. Examples include sodium ($Na^+$), potassium ($K^+$), lithium ($Li^+$), and cesium ($Cs^+$), but the cations are not so limited. The cations may also comprise complex compounds such as ammonium ($NH_4^+$), tetrabutylammonium ($TBA^+$), or tetraethylammonium ($TEA^+$). Furthermore, a mix of cations may be used, which may be advantageous in achieving the desired properties such as solubility, pH, etc.

Figure 5:
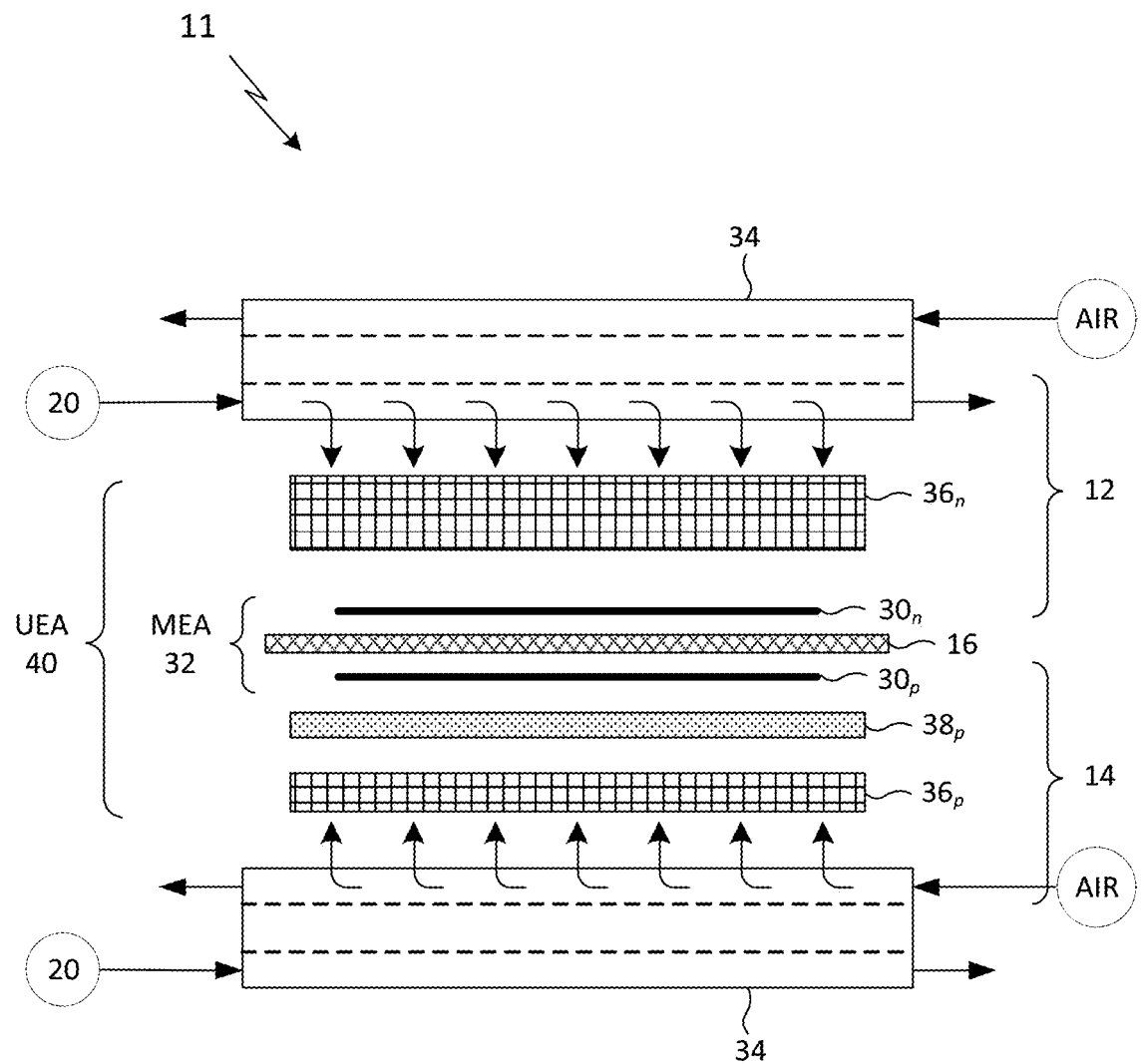
FIG. 5 depicts an schematic cross sectional exploded view of a generic fuel cell, according to one embodiment of the invention.

Turning to FIG. 5, shown is a typical fuel cell 11 which, in general, comprises the first (negative) electrode 12 and the second (positive) electrode 14 separated by an ionomer membrane 16. The negative electrode 12 may include a negative catalyst layer $30_n$ and the positive electrode 14 may include a positive catalyst layer $30_p$ formed on respective sides of the generally planar membrane 16. This assembly is typically referred to as a membrane electrode assembly (MEA) 32.

Reactants (i.e., liquid 20 and air) are directed to the MEA 32 by a flow field plate 34 that typically includes reactant flow channels (indicated by dashed lines). Flow field plate 34 is shown as a bipolar plate, which includes reactant flow channels for both the fuel and oxidant. The reactants pass from the channels through a diffusion layer $36_n$, $36_p$ abutting the flow field plate 34. The negative electrode diffusion layer $36_n$ may comprise a liquid diffusion layer (LDL), and the positive diffusion layer $36_p$ may include a gas diffusion layer (GDL) and a microporous layer (MPL) $38_p$ that is positioned between the GDL and the respective catalyst layer $30_p$. Although not illustrated, the microporous layer $38_p$ may also include a catalyst layer abutting the catalyst layer $30_p$.

The catalyst layers $30_n$, $30_p$ may include catalysts that promote the desired reactions. The catalysts may be supported on electrically-conductive supports, for example carbons or metal oxides. Furthermore, the catalysts may be more than one layer on either electrode to promote the desired charge and discharge reactions. The catalyst layers $30_n$, $30_p$ may include an ionomer (i.e., a polymer with ionic groups) to enhance ionic conductivity in the layer, and may serve as a binder for the layer. Ionomer is desirable in the negative electrode since the liquid is a weak electrolyte with low ionic conductivity. Ionomer is needed in positive electrode since reactants are non-ionic.

The design and composition of the positive electrode 14 may be similar to cathodes used in fuel cells with polymer membranes, which include both proton-exchange membrane fuel cells (PEMFCs) and anion-exchange membranes (AEMFCs). The gas-diffusion layer (GDL) $36_p$ may be hydrophobic (e.g., carbon paper or cloth with some PTFE added). This may be particularly desirable if the reactant is $H_2$ during charging. As noted, the GDL may consist of a micro-porous layer and macro-porous layer. The catalyst layer $30_p$ may consist of two distinct layers with catalysts that promote the two desired reactions (charge and discharge). Alternatively, these multiple catalysts may be mixed in a single layer.

For a cell designed to operate under slightly acidic conditions with protons as the desired charge carriers, the catalysts may comprise Pt or other platinum-group metals (PGMs) or alloys. The ionomer will be a cation-exchange material, such as PFSA or other materials used in PEMFCs.

For a cell designed to operate under slightly alkaline conditions with hydroxyls as the desired charge carriers, the catalysts may comprise a wide variety of materials, such as those used on the cathodes of AEMFCs. For example, $Ni_3S_2$ and Bi/C. The ionomer may be a anion-exchange material, such the material used for membranes in AEMFCs. It may be desirable to make the pH of this electrode moderate (e.g., between ~7 to 10), which can be enabled by using ionomers comprised of weak basic anion (WBA) ion-exchange resins, that will keep water phase in this electrode near-neutral.

The design and composition of the diffusion layer $36_n$ in the negative electrode 12 may be similar to those used in rechargeable flow batteries (RFBs). This layer is hydrophilic on the negative side (e.g., carbon paper or cloth that has been pre-oxidized). Unlike most RFB electrodes, there may also be a catalyst layer included to help promote the desired redox reaction on this electrode. The catalyst layer may comprise two distinct layers with catalysts that promote the two desired reactions (charge and discharge) or mixed catalysts in one layer.

For a cell designed to operate under slightly acidic conditions with protons as the desired charge carriers, the catalysts $30_n$ may be supported on carbon and consist of Pd or alloys of Pd, other PGMs, or Bi (e.g., Bi/C). The ionomer will be a cation-exchange material; however, it may be desirable to make the pH of this electrode moderate (e.g., between ~6 to 7), which can be enabled by using ionomers comprised of weak acid ion-exchange resins, that will keep this electrode near-neutral.

For a cell designed to operate under slightly alkaline conditions with hydroxyls as the desired charge carriers, the catalysts may be the same as those noted above, or of a broader range of materials enabled by this non-acidic conditions (i.e., not PGMs). The ionomer may be a anion-exchange material, such as the material used for membranes in AEMFCs.

FIG. 6 depicts a description of the material choices for the separator 16, corresponding to Slide 42 of the above-named priority provisional application.

FIGS. 7 and 8 depict a description and drawings of design options for the separator 16, corresponding to Slide 42 of the above-named priority provisional application.

FIG. 9 depicts a description and drawings of material options for the bipolar plate 34, corresponding to Slide 37 of the above-named priority provisional application.

Figure 11:
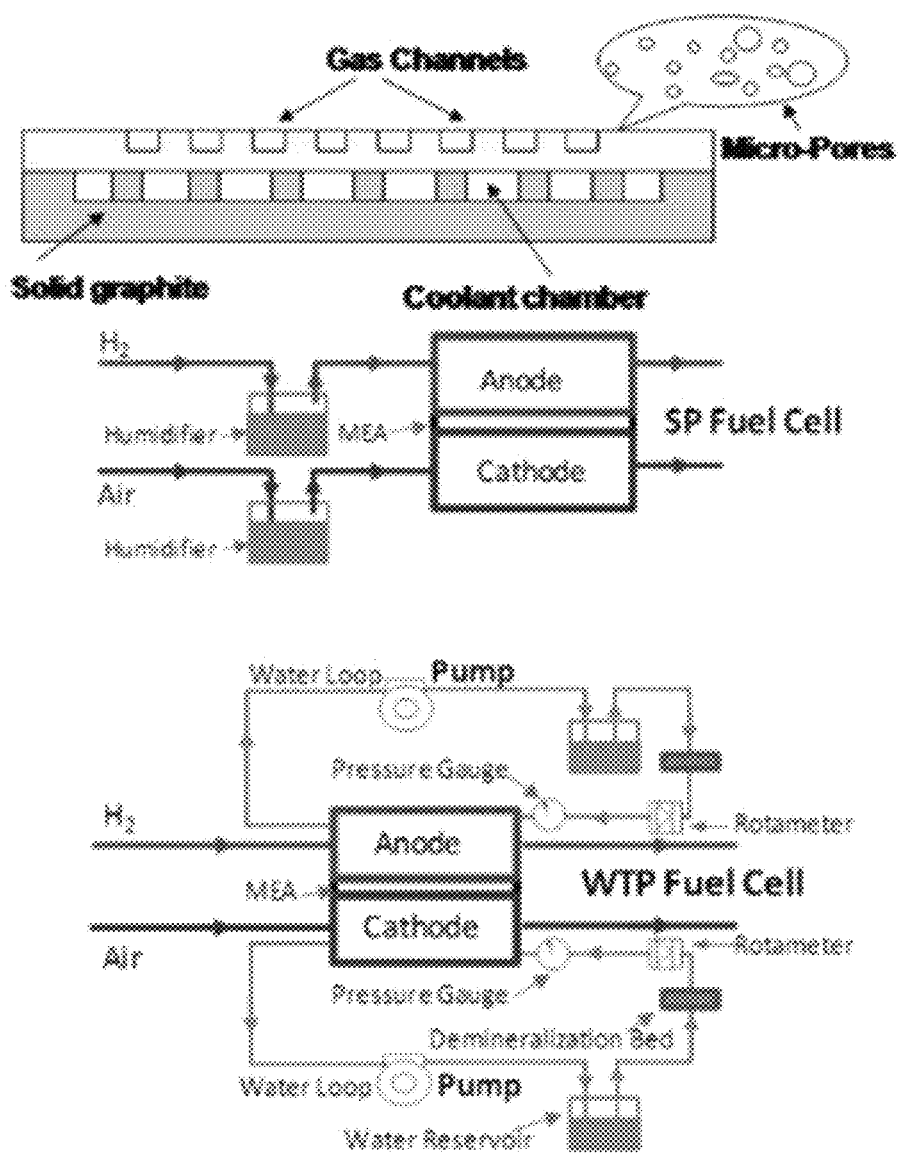
FIG. 11 depicts drawings of design options for the bipolar plate shown in FIG. 5.

FIGS. 10 and 11 depict a description and drawings of design options for the bipolar plate 34, corresponding to Slide 38 of the above-named priority provisional application.

Figure 13:
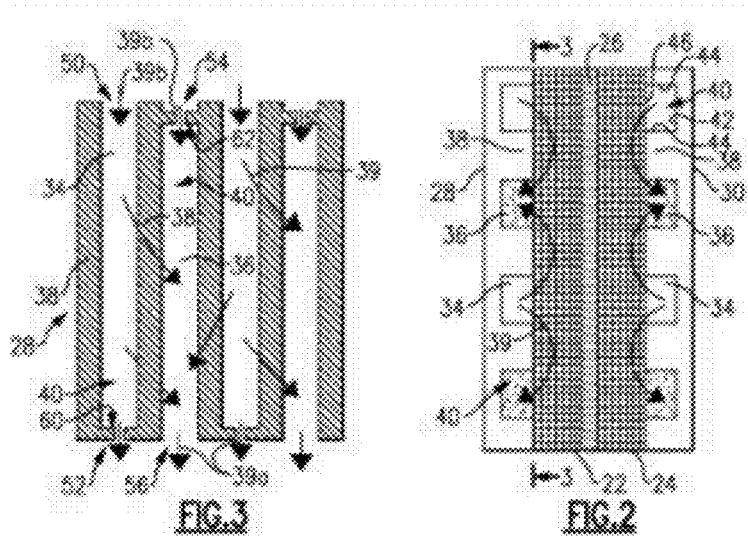
FIG. 13 depicts a drawings of design options for the flow fields in the negative and positive electrodes shown in FIG. 5.

FIGS. 12 and 13 depict a description and drawings of design options for the flow fields in the negative and positive electrodes 12, 14, corresponding to Slide 39 of the above-named priority provisional application.

FIGS. 14 and 15 depict a description and drawings of the impact of species crossover in the separator 16 with an acidic gas electrode 14 of the disclosed fuel cell system 10, corresponding to Slide 44 of the above-named priority provisional application.

FIG. 16 depicts a description of the impact of species crossover in the separator 16 with an alkaline gas electrode 14 of the disclosed fuel cell system 10, corresponding to Slide 45 of the above-named priority provisional application.

Figure 17:
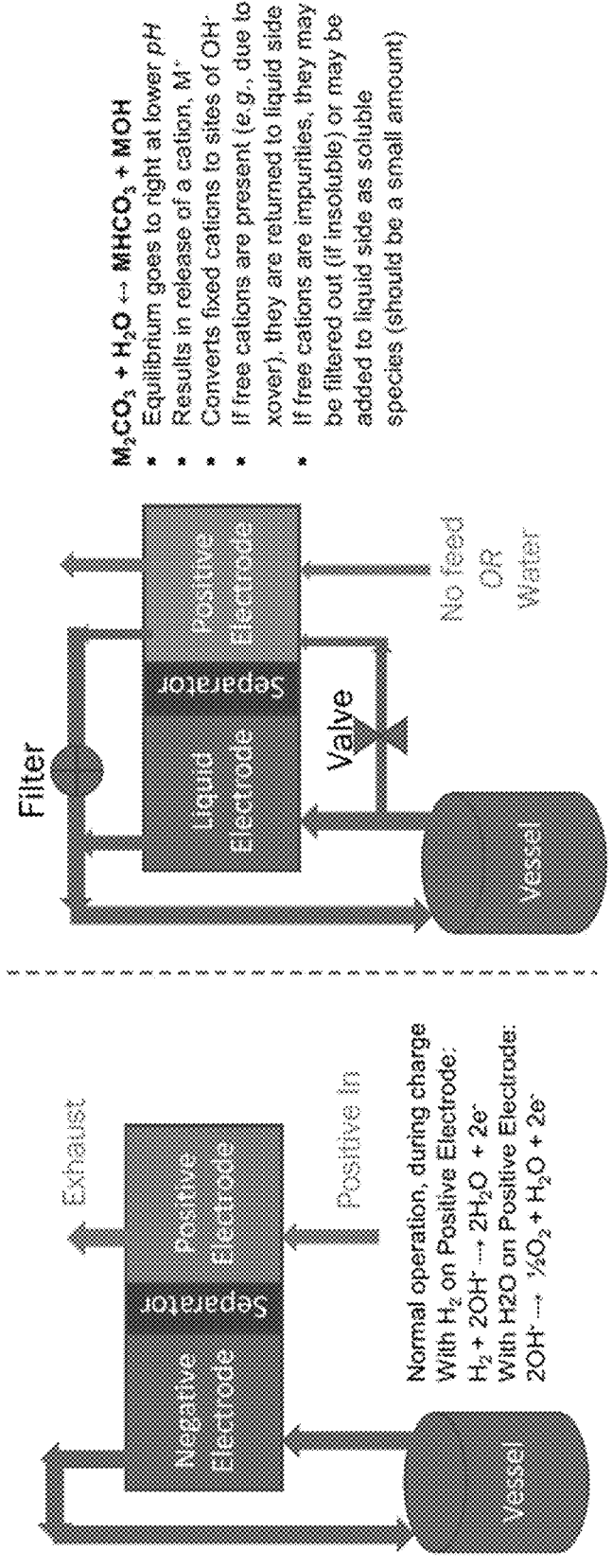
FIGS. 17 and 18 depict a description and drawings of the removal of carbonates on the gas electrode shown in FIG. 5 in an alkaline system.
Figure 18:
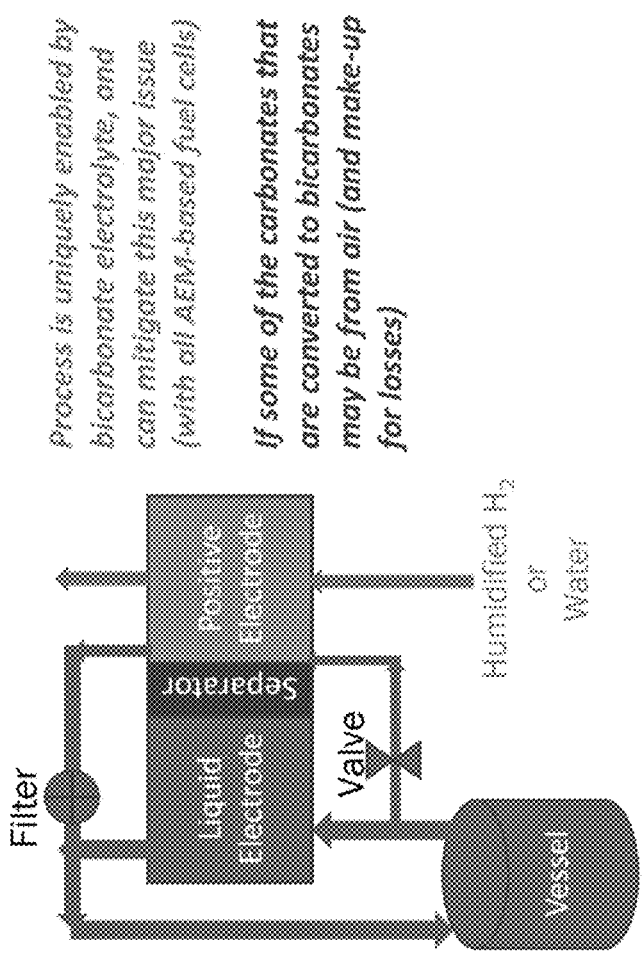

FIGS. 17 and 18 depict a description and drawings of the removal of carbonates on the gas electrode 14 in an alkaline system 10, corresponding to Slides 46 and 47 of the above-named priority provisional application.

Figure 19:
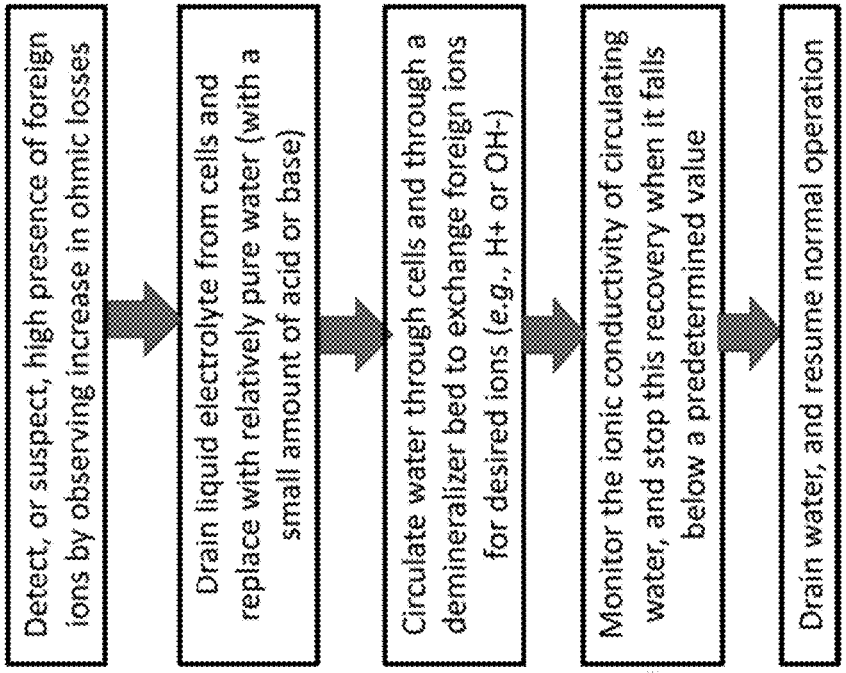
FIG. 19 depicts a description of a method for removing accumulated foreign ions in the ionomer or in the ion-exchange membrane shown in FIG. 5.

FIG. 19 depicts a description of a method for removing accumulated foreign ions in the ionomer or in the ion-exchange membrane 16, corresponding to Slide 48 of the above-named priority provisional application.

Figure 20:
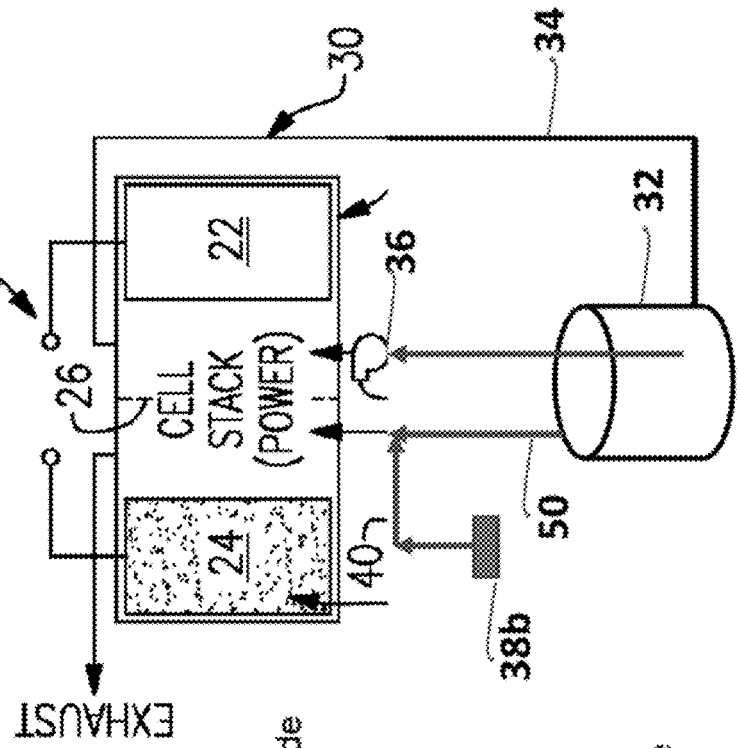
FIG. 20 depicts a description of a method for charging and discharging the liquid shown in FIG. 5.

FIG. 20 depicts a description of a method for charging the liquid 20 using bicarbonate salt or bicarbonate and formate salt electrolyte solution and gaseous reductant, such as hydrogen, and discharging using formate salt or formate and bicarbonate salt electrolyte solution and gaseous oxidant, such as oxygen or air, corresponding to Slides 49 and 50 of the above-named priority provisional application.

Figure 21:
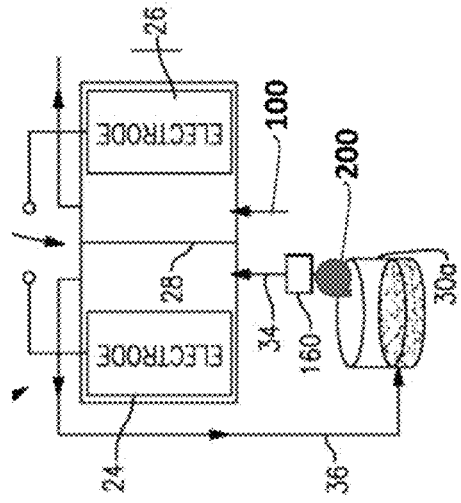
FIG. 21 depicts a description and drawings of a method for the storing reactants shown in FIG. 5.

FIG. 21 depicts a description and drawings of a method for storing reactants, corresponding to Slide 51 of the above-named priority provisional application.

Figure 23:
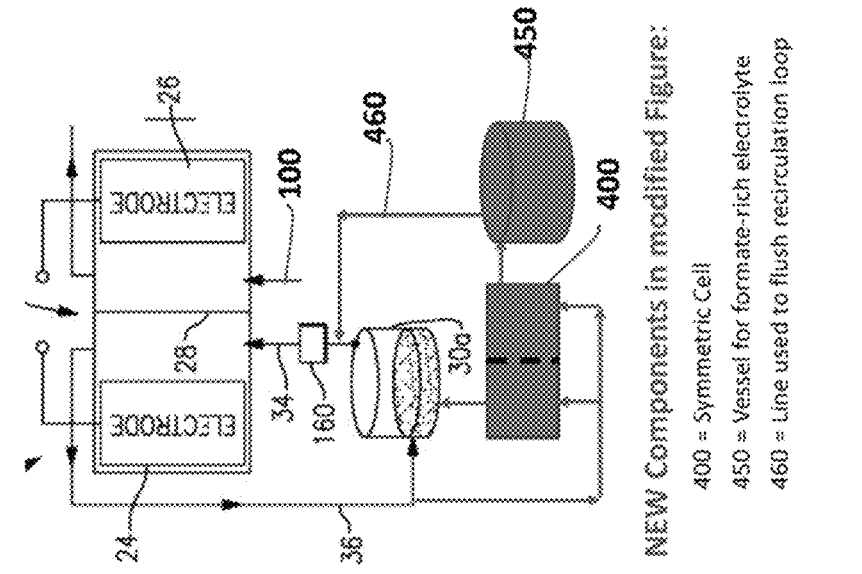

FIGS. 22 and 23 depict a description, drawings, and method of operation for a symmetrical cell, corresponding to Slides 52 and 53 of the above-named priority provisional application.

Figure 24:
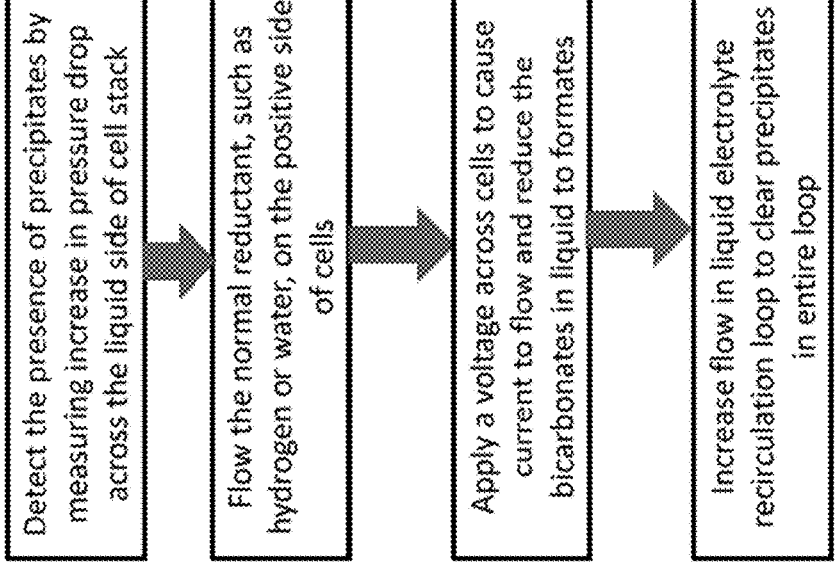
FIG. 24 depicts a description of a method for recovering from inadvertent precipitation on the liquid electrode shown in FIG. 5.

FIG. 24 depicts a description of a method for recovering from inadvertent precipitation on the liquid electrode 12, corresponding to Slide 54 of the above-named priority provisional application.

Figure 25:
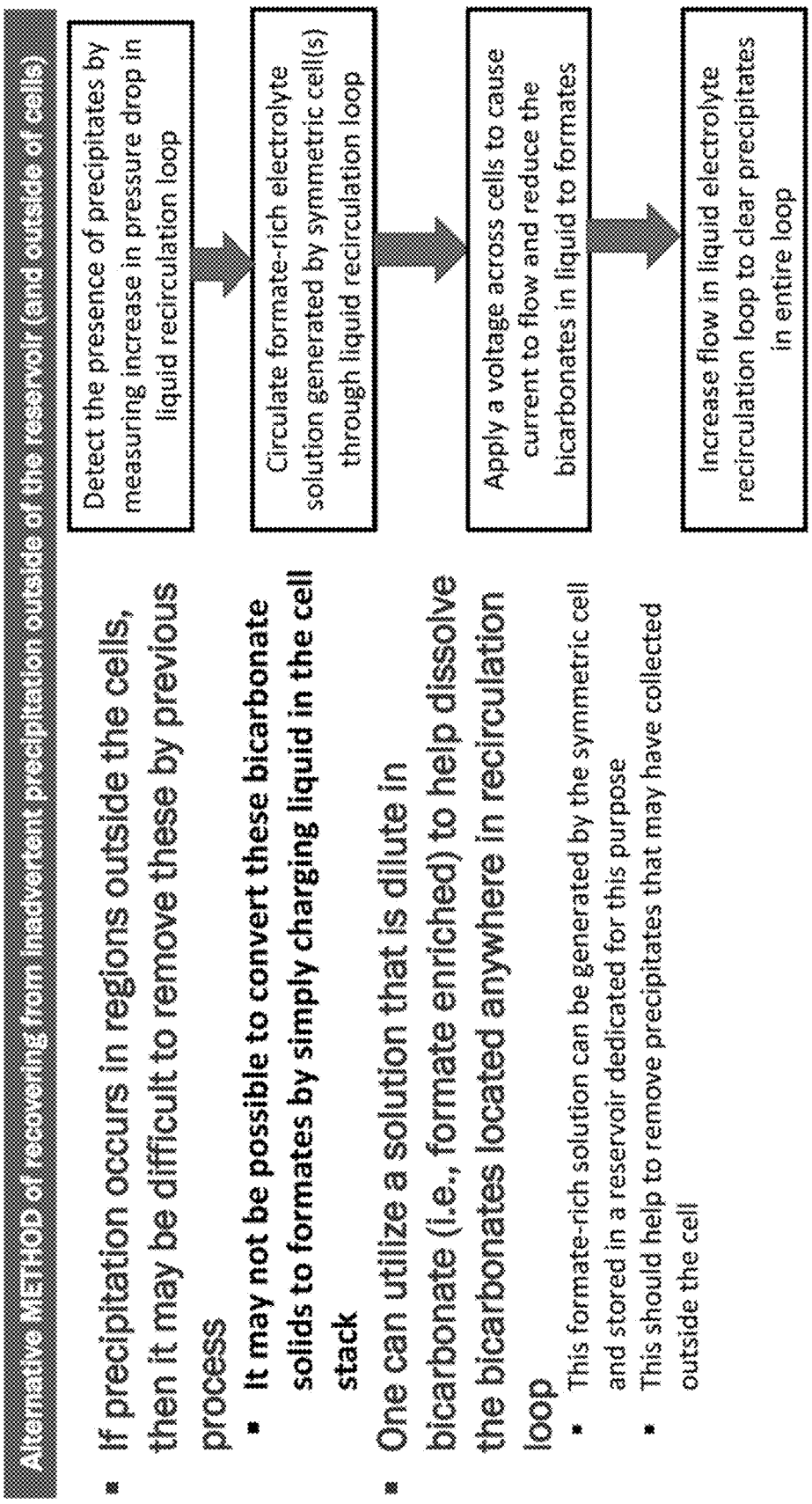
FIG. 25 depicts a description of a method for recovering from persistent precipitation outside the cells.

FIG. 25 depicts a description of a method for recovering from persistent precipitation outside the cells, corresponding to Slide 55 of the above-named priority provisional application.

FIGS. 26 and 27 depict a description, drawings, and method of operation for maximizing the energy density of the charge solution, corresponding to Slides 56 and 57 of the above-named priority provisional application.

While the present invention has been described with reference to a number of specific embodiments, it will be understood that the true spirit and scope of the invention should be determined only with respect to claims that can be supported by the present specification. Further, while in numerous cases herein wherein systems and apparatuses and methods are described as having a certain number of elements it will be understood that such systems, apparatuses and methods can be practiced with fewer than the mentioned certain number of elements. Also, while a number of particular embodiments have been described, it will be understood that features and aspects that have been described with reference to each particular embodiment can be used with each remaining particularly described embodiment.

What is claimed is:

1. An electrochemically reversible aqueous liquid fuel for a rechargeable fuel cell system comprising a formate salt and a bicarbonate salt, the formate salt electrochemically converting to the bicarbonate salt upon fuel cell system discharge, and the bicarbonate salt electrochemically converting to the formate salt upon fuel cell system charge.

2. The electrochemically-reversible aqueous liquid fuel according to claim 1, wherein the pH of the liquid fuel is sufficient to favor the bicarbonate salt as a dominant species.

3. The electrochemically-reversible aqueous liquid fuel according to claim 1, wherein the liquid fuel operates, in bulk, in a pH range of about 5 to about 10.

4. The electrochemically-reversible aqueous liquid fuel according to claim 3, wherein the liquid fuel operates, in bulk, in a pH range of about 7 to about 8.

5. The electrochemically-reversible aqueous liquid fuel according to claim 1, wherein the liquid fuel comprises three species in equilibrium: dissolved $CO_{2(aq)}$, bicarbonate ions $HCO_3^-$, and carbonate ions $CO_3^{2-}$, and the pH of the liquid fuel is sufficient to favor the bicarbonate ions as a dominant species.

6. The electrochemically-reversible aqueous liquid fuel according to claim 5, wherein the liquid fuel operates, in bulk, in a pH range of about 5 to about 10.

7. The electrochemically-reversible aqueous liquid fuel according to claim 6, wherein the liquid fuel operates, in bulk, in a pH range of about 6 to about 8.

8. The electrochemically-reversible aqueous liquid fuel according to claim 1, wherein the liquid fuel is stored in a vessel in the fuel cell system, and the liquid comprises a supersaturated two-phase solution of a solid and a liquid.

9. The electrochemically-reversible aqueous liquid fuel according to claim 1, wherein the primary cation in the liquid fuel is an alkali metal, a polyatomic ion, or combinations thereof.

10. The electrochemically-reversible aqueous liquid fuel according to claim 9, wherein the primary cation is selected from the group consisting of $K^+$, $Na^+$, $Ce^+$, $NH_4^+$, and combinations thereof.

\* \* \* \* \*